United States Patent
Bisanti et al.

(10) Patent No.: US 7,397,311 B2
(45) Date of Patent: Jul. 8, 2008

(54) OSCILLATOR COUPLING TO REDUCE SPURIOUS SIGNALS IN RECEIVER CIRCUITS

(75) Inventors: Biagio Bisanti, Antibes (FR); Francesco Coppola, Grasse (FR); Stefano Cipriani, Golfe Juan (FR)

(73) Assignee: RF Magic Inc., San Diego, CA (US)

( * ) Notice: Subject to any disclaimer, the term of this patent is extended or adjusted under 35 U.S.C. 154(b) by 0 days.

(21) Appl. No.: 11/439,658

(22) Filed: May 24, 2006

(65) Prior Publication Data

US 2006/0270372 A1 Nov. 30, 2006

Related U.S. Application Data

(60) Provisional application No. 60/684,505, filed on May 25, 2005.

(51) Int. Cl.
*H03L 7/00* (2006.01)

(52) U.S. Cl. ............... 331/2; 331/46; 331/47; 331/49; 331/74; 455/260; 455/183.2; 455/140; 455/141

(58) Field of Classification Search .......... 331/74, 331/2, 46, 47, 49; 455/260, 183.2, 140, 141
See application file for complete search history.

(56) References Cited

U.S. PATENT DOCUMENTS

| 4,395,777 | A | * | 7/1983 | Oki et al. ............ 455/183.2 |
| 2003/0143960 | A1 | | 7/2003 | Yamawaki |
| 2003/0203743 | A1 | | 10/2003 | Sugar |
| 2004/0043727 | A1 | | 3/2004 | Sato |
| 2004/0087298 | A1 | | 5/2004 | Yamawaki |
| 2004/0263262 | A1 | | 12/2004 | Ravi |

* cited by examiner

*Primary Examiner*—Arnold Kinkead
(74) *Attorney, Agent, or Firm*—Michael W. Landry

(57) ABSTRACT

A first receiver frequency reference is passively coupled to a second receiver by tapping a signal directly from the resonant element, such as a crystal, of an oscillator in the first receiver to drive the input of the second receiver. The sinusoidal signal from the resonant element is relatively free of harmonics and minimizes interference that could be caused by harmonics of a square wave signal coupling or an amplified signal. The oscillator of each receiver can be selectively enabled or disabled to allow the receiver to either generate or receive the frequency reference. This technique of coupling can be used to couple a frequency reference signal between integrated circuit receivers.

11 Claims, 3 Drawing Sheets

OSCILLATOR COUPLING TO REDUCE SPURIOUS SIGNALS IN RECEIVER CIRCUITS

RELATED APPLICATIONS

This application claims priority from U.S. provisional application No. 60/684,505 filed May 25, 2005 entitled "Method of coupling oscillators to reduce spurious signals in receiver circuits", incorporated herein by reference.

BACKGROUND

1. Field of the Invention

The present invention relates to oscillators and specifically to coupling a common reference between two oscillator circuits.

2. Prior Art

In receiver circuits, it is common practice to buffer the crystal oscillator signal of a phase-locked loop (PLL) of a first receiver circuit and use the buffered version of the signal as the reference for the phase-locked loop (PLL) of a second receiver circuit. The buffer used is commonly a saturated amplifier with its output signal being almost a square wave. This square wave output has a high number of harmonics present and some of these harmonics can end up present in the band of the receiver or the band of the mixer's output. The transmission of the harmonic-rich signal between receivers over circuit board traces provides an opportunity for the signal to radiate. The harmonics of the buffered signal can be an interferer and detrimental to the system similar to unwanted signals picked up from the antenna.

FIG. 1 shows the prior art with the buffered oscillator signal being used as the reference for the second receiver circuit's PLL.

SUMMARY OF INVENTION

The crystal oscillator of a first phase-locked loop (PLL) of a first receiver circuit is coupled to a second PLL of a second receiver. This crystal oscillator is shared between the two receiver circuits without using a buffered oscillator signal as in the prior art. By avoiding the use of the buffer, the detrimental harmonics caused by the buffer are eliminated. The reference input buffer of the second receiver circuit is specified according to the amplitude available from the crystal circuit, providing a moderately high input impedance. The extra load capacitance introduced by the device being driven and by the board trace is taken in account during the design of the crystal oscillator circuit. The crystal oscillator (XO) can be of any topology, for example a Pierce crystal oscillator.

In the invention, the crystal oscillator of the second slave receiver is disabled. The oscillator is disabled in the slave device to avoid having the amplified version of the input signal radiating on the board which may cause similar detrimental harmonics as would the use of an output buffer in the prior art. The disabling of the oscillator can be achieved by using one P-type field-effect transistor (FET) and one N-type FET to couple power to the amplifier used in the crystal oscillators.

DETAILED DESCRIPTION OF THE INVENTION

Figure 1:
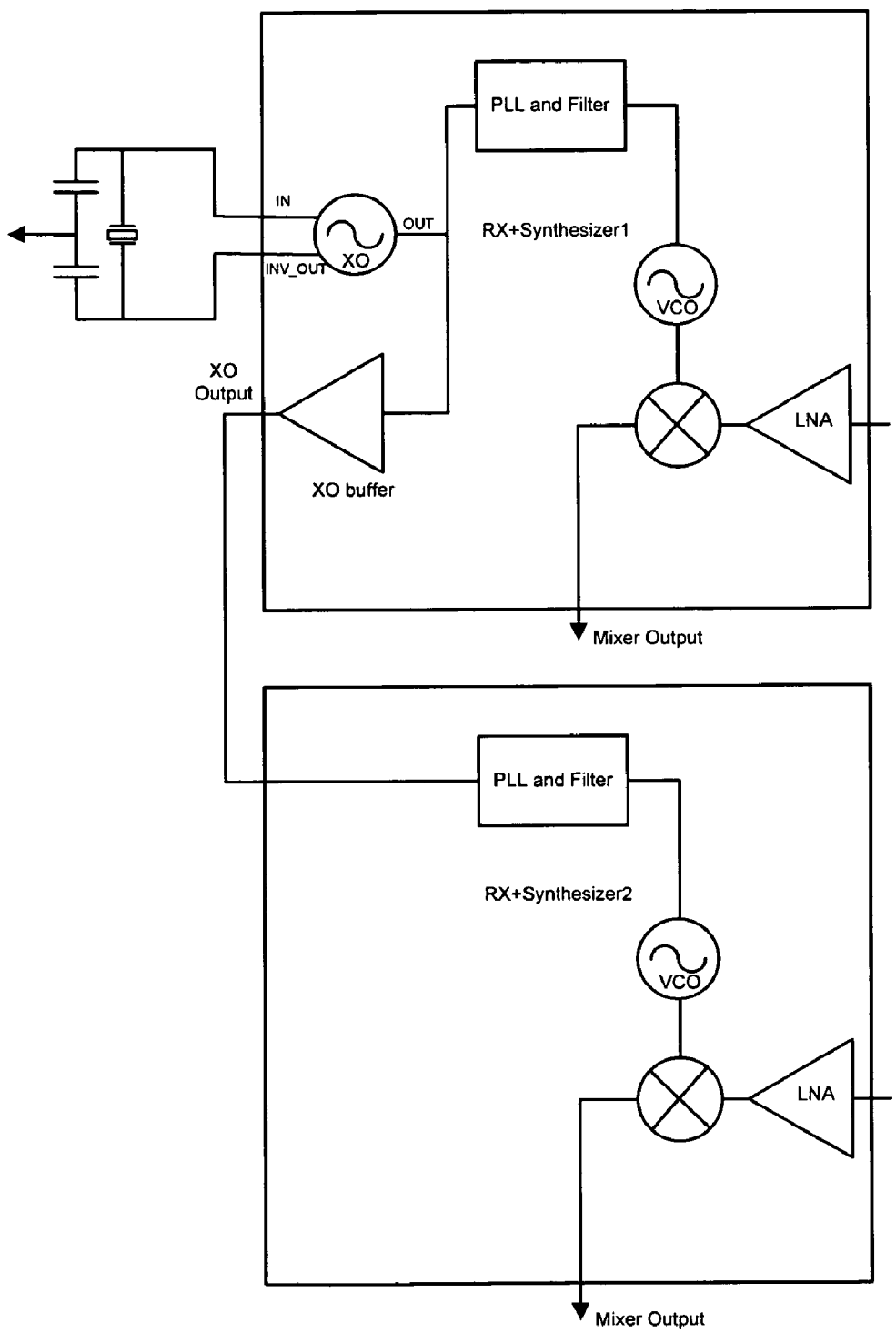
FIG. 1 shows the prior art with the crystal oscillator signal buffered prior to use in the second receiver circuit.
Figure 2:
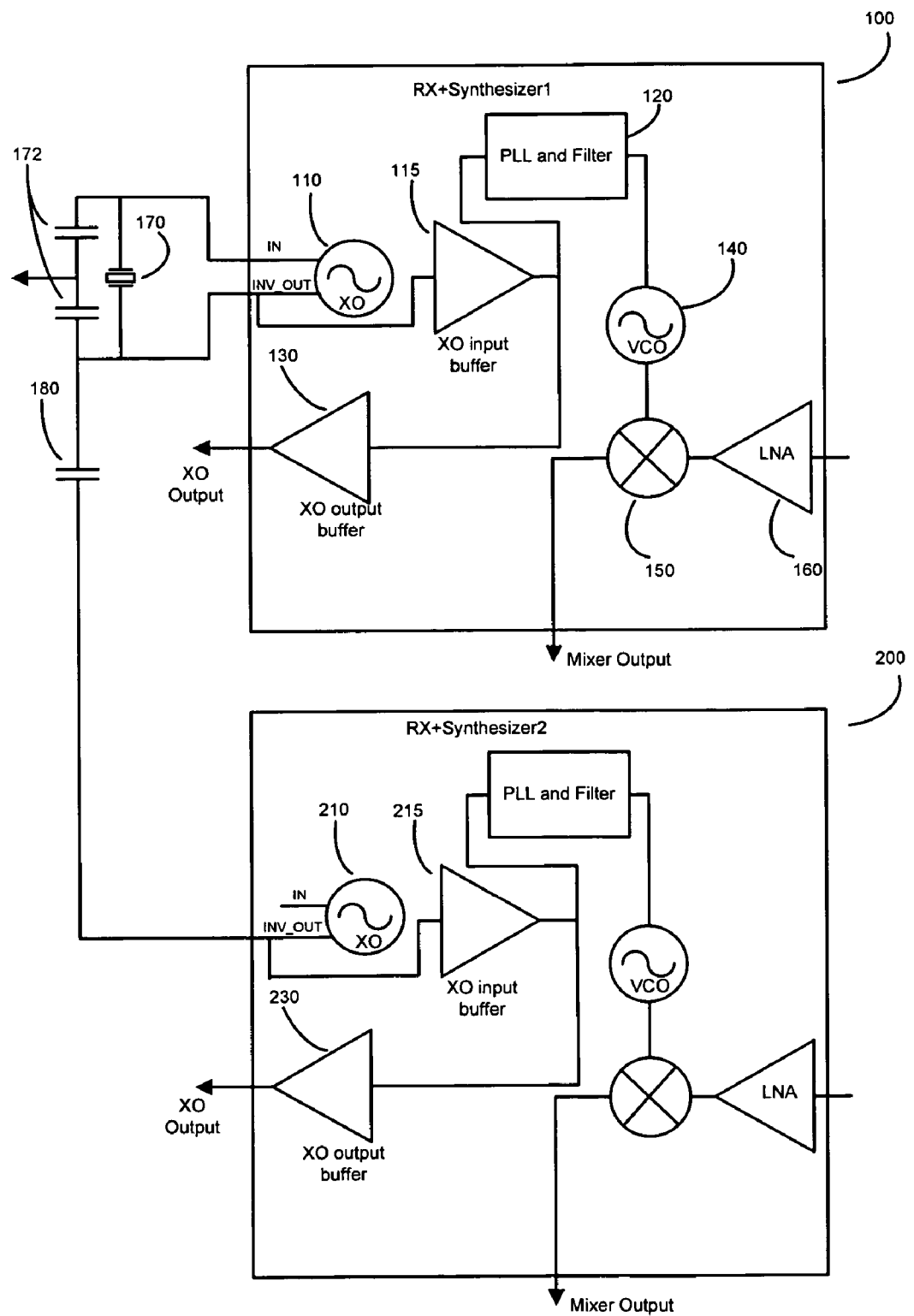
FIG. 2 shows a block diagram of oscillator coupling according to the present invention.

FIG. 2 shows a block diagram coupling an oscillator according to the present invention. Two receiver circuits are shown, master 100 and slave 200. Master receiver 100 comprises oscillator circuit 110, phase-locked loop (PLL) and filter circuit 120, crystal oscillator (XO) input buffer 115, voltage controlled oscillator (VCO) 140, mixer 150 and low noise amplifier (LNA) 160. The crystal oscillator output buffer 130 would be used in the prior art method of coupling the oscillator signal to a second receiver. Capacitors 172 provide the capacitance to achieve the necessary requirement that the overall loop gain has zero (or 360) degrees phase shift at the oscillation frequency. The crystal 170, a resonant element, is connected such that it forms part of the feedback impedance of the inverting amplifier in the crystal oscillator circuit, which operates in a non-saturating linear or near linear mode.

Oscillator circuit 110 drives receiver 200 through capacitor 180, which isolates the direct current bias of oscillator circuit 210 of the slave receiver 200 and passes only the oscillating signal. The signal is coupled between receivers passively, without the use of a buffer amplifier. The reference signal from oscillator circuit 110 drives input buffer 215, an amplifier, to provide the reference signal to the PLL of slave receiver 200. When used as a slave device, crystal oscillator circuit 210 is disabled and the reference signal is input at the disabled output terminal of the amplifier of oscillator circuit 210 where input buffer 215 is connected. Input buffer 215 is active and drives the reference signal in receiver 200. A capacitor can optionally be connected to the input of oscillator circuit 210 to provide an AC ground at that terminal.

Output buffers 130 and 230 can be disabled when using the configuration of the present invention. Although not required in the present invention, the output buffer can be included in the receiver circuit to provide compatibility with other devices that do not use the present inventive configuration.

The present circuit and method passively couples a reference oscillating signal between two receivers with a substantially sinusoidal waveform, which avoids coupling and radiation of harmonics of the fundamental waveform that could occur in a signal path between the two receivers. Internal clock signals derived from the reference signal and used in the receivers can be non-sinusoidal or square. The receivers can be implemented as single-chip devices with short internal signal paths that reduce the opportunity for radiation of harmonics that can occur in a long signal path.

Figure 3:
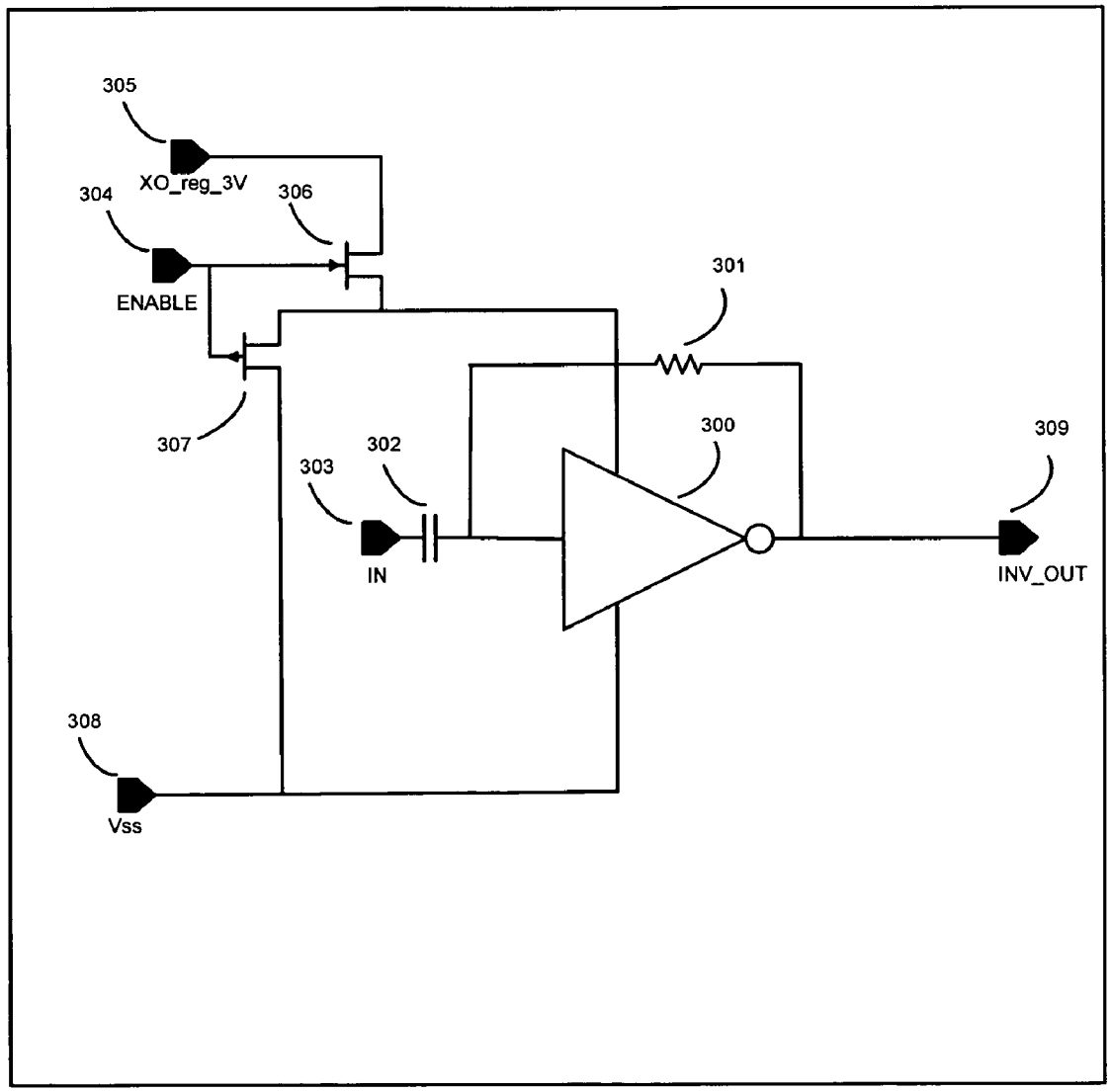
FIG. 3 shows detail of an oscillator circuit for use with the present invention.

FIG. 3 shows the topology of the oscillator 110 and 210, using a Pierce topology. Other oscillator topologies can be used with this invention. The resonator used is preferably a piezoelectric crystal, and can alternatively be an inductor and capacitor circuit. In the master receiver circuit 100, the crystal 170 is connected to the input 303 and output 309 of the active device, inverting amplifier 300, and provides the feedback impedance in parallel with resistor 301. In this configuration, the crystal is operating at or near its series resonant frequency and has low impedance.

The oscillator circuit may be disabled or enabled by the application of enable signal 304. The enable signal 304 is connected to the gate of a P-type field effect transistor (PFET) 306 and to the gate of an N-type field effect transistor (NFET) 307. When the enable signal is high, transistor 306 is active and power 305 is applied to the inverting amplifier 300. When the enable signal 304 is low, transistor 306 is off and transistor 307 is active resulting in a voltage difference of zero being applied to the power inputs of amplifier 300.

The oscillator circuit 110 of the master receiver must be enabled to drive the slave circuitry, while the slave circuit has its oscillator circuit 210 disabled. The selective enabling of the oscillator circuits of the present invention allows identically fabricated devices to be used in a multiple receiver system with programming to select master and slave receivers.

The method of coupling oscillator circuits of the present invention provides component saving in a multiple oscillator circuit while maintaining a spectrally pure reference signal for the oscillators. The transmission of a harmonic-rich non-sinusoidal waveform between receiver devices is avoided. The method and apparatus of connecting receiver frequency references of the present invention can be extended to any number of receivers.

What is claimed is:

1. A method of coupling an oscillating signal from a first receiver to a second receiver comprising:
    connecting a resonant element to a first oscillating circuit in the first receiver wherein the first oscillating circuit is enabled;
    operating the first oscillating circuit in a non-saturating mode to produce a substantially sinusoidal waveform signal on the resonant element;
    using the sinusoidal waveform signal as a frequency reference signal in the first receiver;
    coupling the sinusoidal waveform signal present at the resonant element to a second oscillating circuit in the second receiver wherein the second oscillating circuit is disabled and the second receiver accepts the sinusoidal waveform signal using an input amplifier; and
    using the coupled signal as a frequency reference signal in the second receiver.

2. The method of claim 1 wherein coupling the sinusoidal waveform is done passively without using a buffer amplifier.

3. The method of claim 2 wherein the coupling is performed with a capacitor.

4. The method of claim 1 wherein the resonant element comprises a piezoelectric crystal.

5. The method of claim 1 wherein the resonant element comprises an inductor and capacitor.

6. The method of claim 1 further comprising:
    selectively enabling power to the first and second oscillating circuits, wherein the second oscillating circuit is disabled and the first oscillating circuit is enabled.

7. A receiver device with an oscillator circuit that can selectively couple a frequency reference signal to another receiver device or receive a frequency reference signal from another receiver device comprising:
    a sinusoidal oscillator with an enable circuit;
    an amplifier connected to the output of the oscillator for amplifying the frequency reference signal to drive receiver circuitry;
    wherein in a first mode of operation the oscillator can be enabled and connected to a resonant element to create an oscillator and generate the frequency reference signal;
    and in a second mode of operation the oscillator can be disabled and the receiver device receives the frequency reference signal at the output of the disabled oscillator.

8. The receiver device of claim 7 wherein in the first mode of operation the receiver device drives another like device through a passive coupling.

9. The receiver device of claim 8 wherein the passive coupling consists of a capacitor.

10. The receiver device of claim 7 wherein in the second mode of operation the receiver device receives the frequency reference signal by a passive connection to the resonant element of another like device.

11. The receiver device of claim 10 wherein the passive coupling consists of a capacitor.

* * * * *